Figure 1:
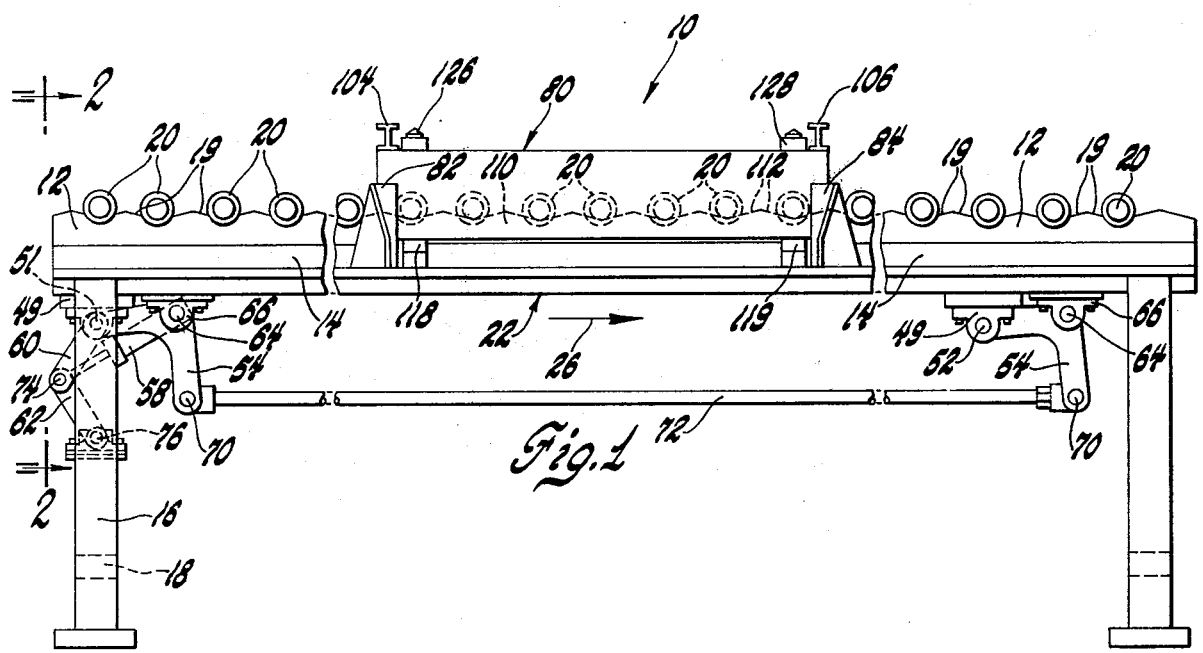

United States Patent [19]

Bartos

[11] 4,054,200
[45] Oct. 18, 1977

[54] ACCUMULATING CONVEYOR HAVING A REMOVABLE PARTS CARRIER

[75] Inventor: Kenneth R. Bartos, Flushing, Mich.

[73] Assignee: General Motors Corporation, Detroit, Mich.

[21] Appl. No.: 753,363

[22] Filed: Dec. 22, 1976

[51] Int. Cl.² .............................................. B65G 25/04
[52] U.S. Cl. .................................................... 198/774
[58] Field of Search ................ 198/744, 773, 774, 866

[56] References Cited

U.S. PATENT DOCUMENTS 3,869,040 3/1975 Rice ..................................... 198/774

Primary Examiner—Evon C. Blunk
Assistant Examiner—James L. Rowland
Attorney, Agent, or Firm—Edward J. Biskup

[57] ABSTRACT

An elongated conveyor for moving parts along an axis substantially perpendicular to the longitudinal axes of the parts having an entrance end and an exit end and including a pair of laterally spaced support plates. A series of notches are formed in the upper portion of each of the support plates for supporting and axially spacing the parts. A plurality of positioning members are provided between the support plates for controlling successive movement of the parts from one notch to the next notch in the direction of the exit end of the conveyor. A section of the support plates are provided with transversely aligned openings that serve to accommodate a carrier which is selectively removable and replaceable by a similar carrier that is either filled with parts or empty depending upon whether the conveyor needs or is filled with parts.

3 Claims, 5 Drawing Figures

ACCUMULATING CONVEYOR HAVING A REMOVABLE PARTS CARRIER

The present invention concerns a conveyor system for transporting parts along an axis substantially perpendicular to the longitudinal axis of the parts and is particularly concerned with a conveyor which moves the parts individually so that no part-to-part contact occurs and also permits the parts to automatically accumulate when the conveyor is filled so the parts can remain in their respective stations and await transfer to the next location. The conveyor is characterized by having a portable carrier located at the conveyor's midsection for handling parts as they move along the conveyor and for allowing replacement of the carrier by a similar carrier that is full of parts or empty depending upon the needs of the conveyor.

More specifically, the invention contemplates a conveyor which includes a pair of laterally spaced support plates the upper portions of which are formed with a series of uniformly spaced notches. Each pair of laterally spaced notches is adapted to support an individual part along an axis extending transversely to the longitudinal axis of the support plate. The conveyor also includes a plurality of positioning members each of which is supported for pivotal movement between each pair of axially spaced notches for controlling successive movement of the parts from one notch to the next notch in the direction of the exit end of the conveyor. An operating mechanism including a drive assembly is positioned below the positioning members and is adapted to raise and then lower the positioning members relative to the support plates so when the conveyor is filled with parts, the positioning members cause each of the parts to be removed from its notch and returned to the same notch from which it was removed. When one of the notches is empty, however, upward and then downward movement of the positioning members causes the parts preceding the empty notch to be cammed by one positioning member onto a receiving surface on the adjacent positioning member and deposited by the latter in the associated notch. In addition, the support plates have a section thereof of predetermined length removed between the entrance and exit ends of the conveyor so as to provide an opening. A parts carrier is adapted to fit into the opening and includes a pair of laterally spaced support beams which longitudinally and horizontally align with the support plates. The upper portions of the support beams are formed with notches which correspond in spacing and configuration with the notches in the support plates and also serve to support parts as they are moved towards the exit end of the conveyor. The carrier and the conveyor base are formed with cooperating locating means in the form of tapered pins and holes for assuring alignment of the support beams with the support plates whenever the carrier is placed in the opening so as to permit the positioning members to guide and control movement of the parts on the support beams towards the exit end of the conveyor. Thus, the carrier can be removed and replaced by a similar carrier that is filled with parts or empty depending upon whether the conveyor does or does not require more parts.

The objects of the present invention are to provide a new and improved conveyor which will move individual parts along an axis substantially perpendicular to the longitudinal axes of the parts and has a removable and replaceable carrier for the parts so that parts handling can occur as a modular function; to provide a new and improved conveyor system for parts that serves to space the parts during movement thereof and causes all of the parts preceding an empty notch to be moved simultaneously towards the empty notch and which incorporates a portable carrier that can be lifted from the base of the conveyor and replaced by a similar carrier that is filled with parts when the system requires additional parts; and to provide a new and improved accumulating type conveyor having a series of transversely aligned notches for supporting cylindrical parts and provided with positioning members which will successively move cylindrical parts along the longitudinal axis of the conveyor without causing rubbing action between the parts and has a removable and replaceable carrier for parts located between the ends of the conveyor.

Figure 2:
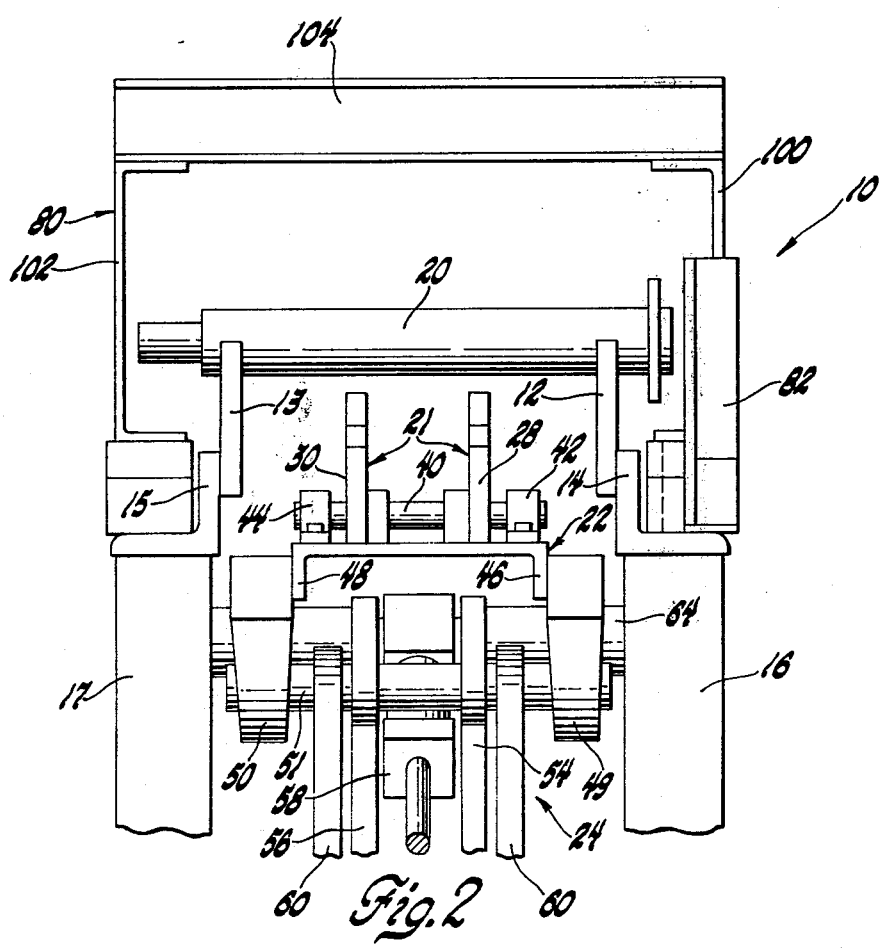
Figure 3:
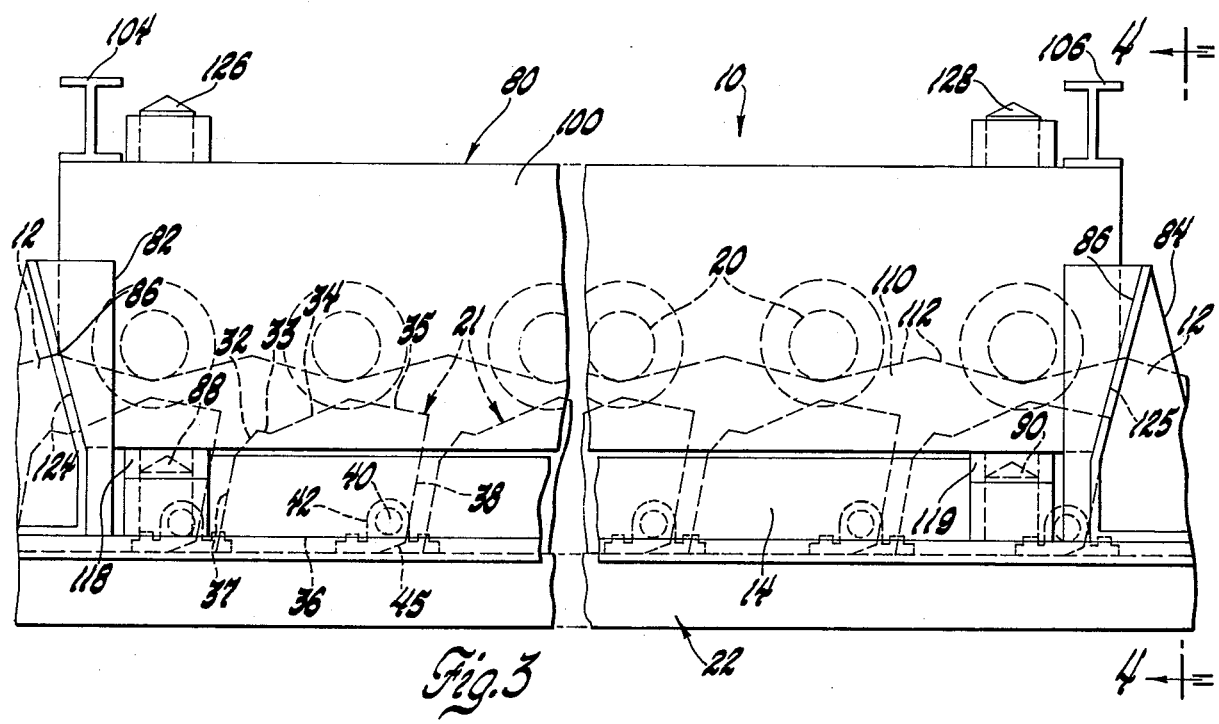
Figure 4:
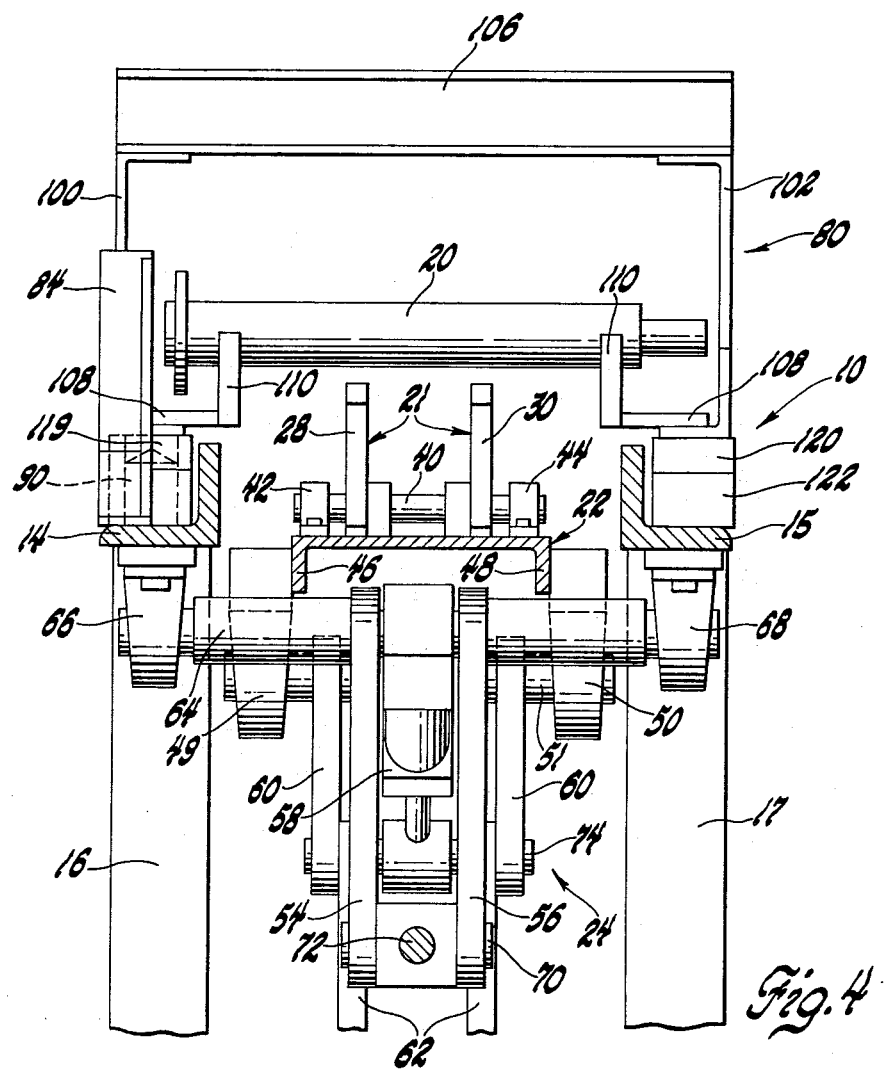
Figure 5:
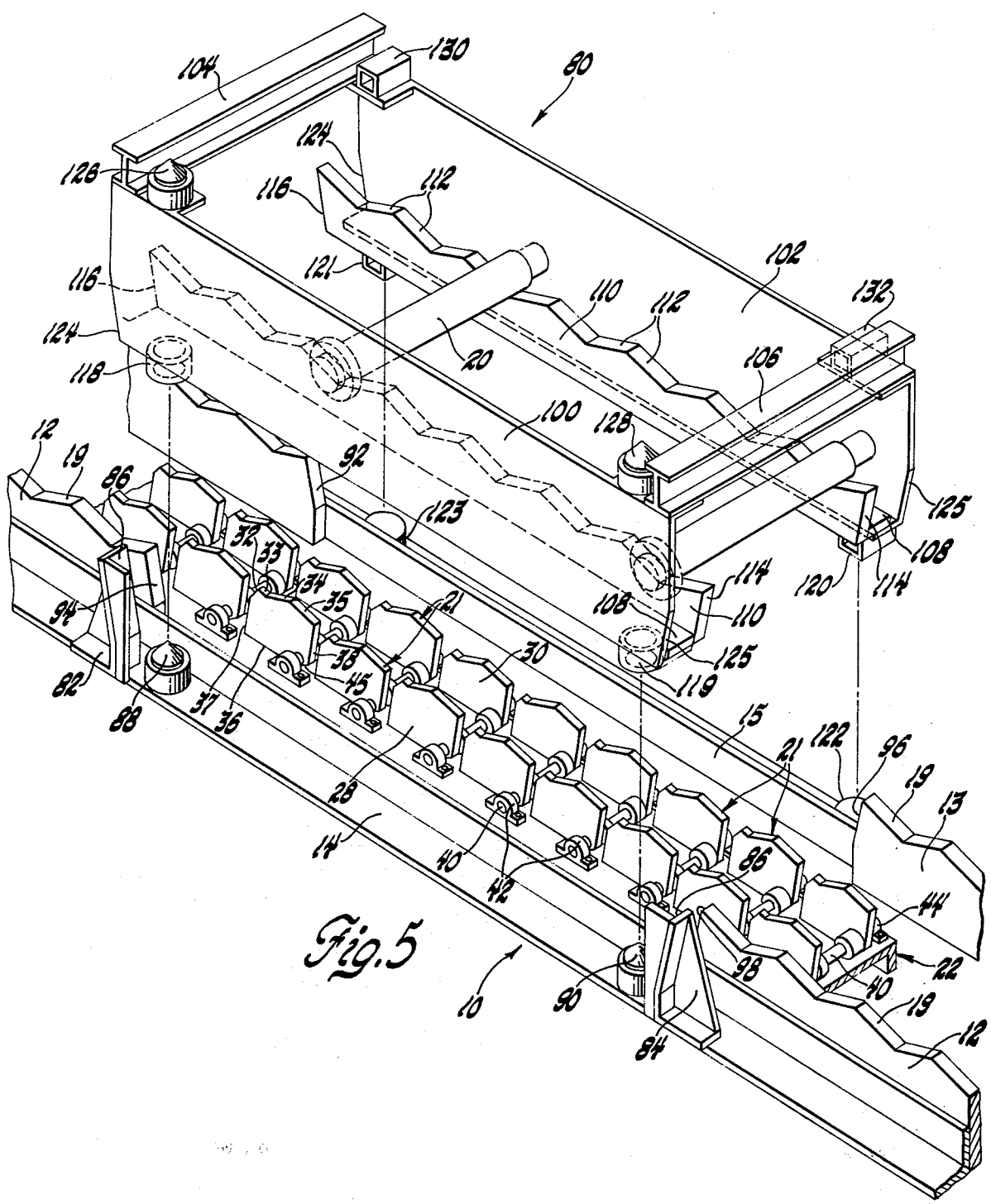

Other objects and advantages of the present invention will be derived from the following detailed description when taken with the drawings in which:

FIG. 1 is an elevational side view of a conveyor made in accordance with the invention for moving cylindrical parts and having a removable and replaceable parts carrier, FIG. 2 is an end view of the conveyor of FIG. 1 taken along lines 2—2, FIG. 3 is an enlarged view showing the parts carrier incorporated with the conveyor of FIG. 1, FIG. 4 is a view taken on line 4—4 of FIG. 3, and FIG. 5 is a perspective view showing the parts carrier removed from the conveyor.

Referring to the drawings and more specifically FIGS. 1 and 4 thereof, a material handling elongated conveyor 10 is shown having an entrance end located at the left-hand portion of the drawing and an exit end located at the right-hand portion of the drawing. The conveyor generally comprises a pair of parallel upstanding support plates 12 and 13 which, as seen in FIG. 2, are laterally spaced and respectively supported at the lower ends thereof by side rails 14 and 15 which in turn are supported by two longitudinal spaced sets of vertical stanchions 16 and 17. Each pair of stanchions 16 and 17 has the lower end thereof interconnected by a transverse cross bar 18 so as to form a rigid frame which can be positioned in a manufacturing plant adjacent automatic material handling apparatuses which may serve to deposit cylindrical parts onto the entrance end of the conveyor and remove parts from the exit end of the conveyor 10.

The upper portion of each of the support plates 12 and 13 is formed with a series of V-shaped notches 19 which are identical in size and uniformly spaced along the longitudinal axis of the conveyor 10. Each pair of laterally spaced notches is adapted to support one of a plurality of cylindrical parts 20 with the longitudinal axis thereof extending substantially normal to the longitudinal axis of the support plates 12 and 13. A drive assembly including a plurality of identical positioning members 21, a lifter member 22 and an operating mechanism 24 are located between the support plates 12 and 13 for causing the cylindrical parts 20 to be moved successively in the direction of the arrow 26 from the entrance end to the exit end of the conveyor 10.

As seen in FIGS. 2 and 3, each positioning member 21 consists of a pair of identical and laterally spaced sections 28 and 30 each of which has the upper portion thereof formed with four angularly related surfaces 32, 33, 34 and 35, a base edge 36, and side edges 37 and 38.

The surfaces 32-35 cooperate with the notches 19 formed in the support plates 12 and 13 for controlling movement of the cylindrical parts 20 from the entrance end to the exit end of the conveyor 10. Each section 28 and 30 has surfaces 32 and 34 thereof located in planes which are inclined downwardly towards the entrance end of the conveyor 10 while surfaces 33 and 35 are located in planes which are inclined downwardly towards the exit end of the conveyor 10. Moreover, each pair of transversely aligned sections 28 and 30 are rigidly interconnected by a transverse shaft 40 the opposite ends of which are rotatably journaled in bearing members 42 and 44 carried by the lifter member 22 as seen in FIG. 3. Thus, the shaft 40 serves as a pivotal connection for the positioning member 21 that is located below surface 35 and between the lowest points of a pair of adjoining notches 19. It will be noted that the positioning member 21 normally rests on the upper surface of the lifter member as seen in FIGS. 2 and 3, and that adjacent the shaft 40, the lower right-hand corner of each positioning member 21 is formed with an inclined stop surface 45. Thus, clockwise rotation of the positioning member 21 from the rest position is limited to the angle shown in FIGS. 4 and 5 when stop surface 45 contacts the lifter member 22.

As seen in FIGS. 1 and 2, the lifter member 22 includes a pair of laterally spaced rails 46 and 48 which through bearing members 49, 50 are supported and interconnected by longitudinally spaced shafts 51 and 52 each of which has the opposite ends thereof secured to one end of a pair of identical transversely spaced bell cranks 54 and 56. The bell cranks 54 and 56 form a part of the operating mechanism 24 which includes an actuating cylinder 58 and a drive linkage consisting of link members 60 and 62. Each pair of transversely aligned bell cranks 54 and 56 are rigidly connected to a shaft 64 the opposite ends of which are rotatably journaled in bearing members 66 and 68 respectively secured to the underside of side rails 14 and 15. The lower ends of the bell cranks 54 and 56 are interconnected by a pivot shaft 70. A rod 72 extends between the pivot shafts 70 of each pair of bell cranks 54 and 56 so as to join the latter for concomitant movement. As seen in FIG. 1, the link members 60 have the upper ends thereof pivotally mounted on the shaft 51 while the lower ends are pivotally mounted on a shaft 74 which serves as a common support for the rod end of actuating cylinder 58 and for the upper ends of link members 62. The lower ends of link member 62 are fixed with a shaft 76 which is rotatably supported by a bearing member secured to the frame of the conveyor.

Thus, it should be apparent from the above description that upon contraction and extension of the actuating cylinder 58 the link members 60 and 62 move between the full line position of FIG. 1 wherein the link members are angled relative to each other to a position wherein the link members are substantially vertically aligned. This movement in turn causes the lifter member 22 and accordingly the positioning members 21 to be alternately raised and lowered under the control of the two sets of bell cranks 54 and 56. Thus, during operation of the conveyor 10 described and assuming all of the notches 19 in the support plates 12 and 13 are filled with cylindrical parts 20, upward movement of the lifter member 22 causes the parts 20 to be raised and lowered. In this regard, as the positioning members 21 are raised from the location shown in FIG. 3, the surface 35 initially contacts the lower portion of the cylindrical part 20 at a point to the left of a vertical line passing through the center of the cylindrical part 20. As the positioning member 21 continues to rise, the cylindrical part 20 begins to roll to the right along the inclined surface 35 until it reaches a point where the center of gravity of the cylindrical part is to the right of the center axis of the shaft 40. At this point, the positioning member 21 tilts clockwise about its pivotal connection. The adjacent positioning member 21 experiences the same movements and accordingly permits surface 32 to raise upwardly and cooperate with surface 35 of the preceding positioning member for providing a seat for the cylindrical part 20. Continued upward movement of the positioning members 21 causes the cylindrical parts 20 to be raised upwardly above the support plates 12 and 13. At this point the actuating cylinder 58 is fully contracted and the link members 60 and 62 are substantially vertically aligned. Through appropriate valving, not shown, the actuating cylinder 58 then starts to expand so that the link members 60 and 62 move from a vertically aligned position towards the full line position seen in FIG. 1. As aforementioned, this causes the lifter member 22 to be lowered so that the positioning members 21 are similarly lowered. During the latter movement each cylindrical part 20 is returned to the same notch 19 from which it was removed.

Assuming one of the cylindrical parts 20 is removed from the conveyor 10, then all of the preceding positioning members 21 cause the cylindrical part 20 to be contacted in the same manner as explained above causing the cylindrical part 20 to be raised at which point it moves down the surface 35 and produces a clockwise pivoting action of the positioning member 21. However, inasmuch as the succeeding notch 19 is now empty, the positioning member 21 associated therewith is raised vertically upwardly without any tilting movement thereof. As a result, the surface 33 of the succeeding positioning member 21 is located at a lower level than surface 35 of the preceding positioning member 21 and serves to receive the cylindrical part 20. When the positioning members 21 are then lowered, the cylindrical part 20 is then deposited on the left side of the V-shaped notch 19 permitting it to roll there along to the center of the notch. The same occurs to all of the cylindrical parts preceding the empty notch.

A conveyor similar to the conveyor 10 described above and shown in the drawings can be seen in Rice U.S. Pat. No. 3,869,040 entitled "Conveyor for Cylindrical Parts" issued on Mar. 4, 1975 and assigned to the assignee of this invention. Reference is made to the latter mentioned patent for a full detailed description and disclosure of the operating mechanism 24 and the manner that the positioning members 21 function to move the cylindrical parts 20.

The conveyor 10 differs from the conveyor shown in the Rice patent in that the midsection of the support plates 12 and 13 has an opening formed therein of a predetermined length for supporting a portable parts carrier 80. In this regard, and with reference to FIGS. 3, 4 and 5, it will be noted that the side rail 14 is provided with a pair of upright guide members 82 and 84 each of which is formed with a downwardly sloping surface 86. The guide members 82 and 84 together with upstanding pin members 88 and 90 secured to side rail 14 serve to properly position the parts carrier 80 so that the conveyor 10 can continue to function in the normal manner for moving parts from the entrance end to the exit end.

The parts carrier 80 allows the conveyor 10 to be positioned between two machines which may be performing drilling, cutting or other operations on the parts handled by the conveyor. Thus, at the entrance end of the conveyor 10 a machine would be located that may perform one operation on the cylindrical part 20 after which the cylindrical part would be moved onto the conveyor 10 at the entrance end thereof for subsequent movement to the exit end wherefrom the cylindrical part would then be fed into a machine for another operation. In this type of manufacturing system, it should be apparent if the machine at the exit end of the conveyor 10 is disabled for some reason, the machine at the entrance end must be shutdown. Similarly, if the output speed of the machine at the entrance end of the conveyor 10 is greater than the output speed of the machine at the exit end, the parts must be removed from the conveyor to allow the system to function properly. Accordingly, in order to alleviate both of these potential problems, the conveyor 10 incorporates the parts carrier 80 which is capable of being removed and replaced by a similar parts carrier which, depending upon circumstances, will be loaded with parts or empty in order to permit one or the other machine to continue operating.

As mentioned above, the parts carrier 80 is positionable within the opening provided in the support plates 12 and 13 of the conveyor. The opening is defined by the vertical edges 92, 94, 96 and 98 of the support plates 12 and 13. The parts carrier 80 is adapted to fit into the opening as seen in FIG. 3, and serve as an integral part of the conveyor 10 for transporting the cylindrical parts 20. More specifically, the parts carrier 80 comprises a pair of laterally spaced and parallel side walls 100 and 102, the upper ends of which are rigidly interconnected by a pair of cross bars 104 and 106. The lower end of each side wall 100, 102 is rigidly formed with a horizontal flange 108 which carries a support beam 110 which is located in a plane that is parallel to the adjacent side wall. The upper edge of each support beam 110 is formed with V-shaped notches 112 which correspond in spacing and configuration with the notches 19 formed in the support plates 12 and 13.

Each of the support beams 110 has the opposed ends thereof terminating with substantially vertically oriented edges 114 and 116 which are adapted to meet the edges 92-98 of the support plates 12 and 13 when the parts carrier is located in the opening formed therein. In addition, the flange 108 adjacent the side wall 100 rigidly carries a pair of cylindrical locaters 118 and 119 which are adapted to mate with the upright pins 88 and 90 secured to the side rail 14. The flange 108 adjacent side wall 102 rigidly carries block members 120 and 121 which respectively rest on cylindrical locaters 122 and 123 attached to side rail 15 when the parts carrier 80 is located in the opening in the support plates 12 and 13. The lower ends of each side wall 100 and 102 is also formed with inclined surfaces 124 and 125 which cooperate with the sloping surfaces 86 formed on the guide members 82 and 84 for helping position the parts carrier 80 when the latter is placed in the opening in the support plates 12 and 13. It will be noted that the upper portion of the side wall 100 is rigidly formed with pin members 126 and 128 which are vertically aligned with the cylindrical locaters 118 and 120, and the upper portion of side wall 102 is rigidly formed with block members 130 and 132 which are vertically aligned with and identical to the block members 120 and 121. It should be apparent, that this arrangement of pin and block members allows identical parts carriers to be stacked one above the other for storage purposes.

Once the parts carrier 80 is located in the opening as shown in FIG. 3, the support beams 110 will be longitudinally and vertically aligned with the support plates 12 and 13. Inasmuch as the shape and spacing of the notches 112 in the support beams 110 are the same as the shape and spacing of the notches 19 in the support plates 12 and 13, the positioning members 21 can function as described hereinbefore for transporting the cylindrical parts 20 from the entrance end to the exit end of the conveyor.

Accordingly, it should be apparent from the above that this arrangement permits the conveyor 10 to be supplied with a load of cylindrical parts 20 when the conveyor's requirements are such that parts must be added for maintaining the machine at the exit end of the conveyor to continue operating as alluded to hereinbefore. This would be accomplished by replacing the empty parts carrier 80 with an identical parts carrier that would be full of the cylindrical parts 20. On the other hand, if the situation is such that the machine at the entrance end is operating but the machine at the exit end is disabled, parts accumulating on the conveyor 10 can be removed by replacing the full parts carrier 80 with an identical parts carrier that is empty.

Various changes and modifications can be made in this construction without departing from the spirit of the invention. Such changes and modifications are contemplated by the inventor and he does not which to be limited except by the scope of the appended claims.

I claim:

1. A parts carrier for use with an elongated accumulating conveyor having an entrance end for receiving parts and an exit end from which said parts are removed, said conveyor including a pair of laterally spaced support plates each of which has the upper portion thereof formed with a series of equally spaced and uniform notches for supporting and spacing individual parts, a plurality of identically formed position members located between said support plates for guiding and controlling successive movement of the parts from one notch to the next notch from the entrance end to the exit end of the conveyor, said support plates having a section thereof of a predetermined length removed between the entrance and exit ends of the conveyor so as to provide an opening, said parts carrier adapted to fit into said opening and support a plurality of parts, said parts carrier including a pair of laterally spaced support beams which longitudinally and horizontally align with said support plates when said parts carrier is positioned in said opening, each of said support beams having the upper portion thereof formed with notches which correspond in spacing and configuration with the notches in said support plates and cooperating locating means formed with said container and said conveyor for assuring alignment of said support beams with said support plates when said parts carrier is placed in said opening so as to permit said positioning members to guide and control movement of the parts on said support beams towards the exit end of the conveyor.

2. A parts carrier for use with an elongated accumulating conveyor having an entrance end for receiving parts and an exit end from which said parts are removed, said conveyor including a pair of laterally spaced support plates each of which has the upper portion thereof formed with a series of equally spaced and uniform notches for supporting and spacing individual parts, a plurality of identically formed positioning members located between said support plates for guiding and controlling successive movement of the parts from one notch to the next notch from the entrance end to the exit end of the conveyor, said support plates having a section thereof of a predetermined length removed between the entrance and exit ends of the conveyor so as to provide an opening, said parts carrier adapted to fit into said opening and support a plurality of said parts, said parts carrier including a pair of laterally spaced support beams which longitudinally and horizontally align with said support plates when said parts carrier is positioned in said opening, means interconnecting said support beams so as to provide a rigid unit that can be selectively removed from said opening and replaced by another parts carrier, each of said support beams having the upper portion thereof formed with notches which correspond in spacing and configuration with the notches in said support plates, and cooperating locating means formed with said parts carrier and said conveyor for assuring alignment of said support beams with said support plates when said parts carrier is placed in said opening so as to permit said positioning members to guide and control movement of the parts on said support beams towards the exit end of the conveyor.

3. A parts carrier for use with an elongated accumulating conveyor having an entrance end for receiving cylindrical parts and an exit end from which said cylindrical parts are removed, said conveyor including a pair of laterally spaced support plates each of which has the upper portion thereof formed with a series of equally spaced and uniform V-shaped notches for supporting and spacing individual cylindrical parts, a plurality of identically formed positioning members located between said support plates for guiding and controlling successive movement of the cylindrical parts from one notch to the next notch from the entrance end to the exit end of the conveyor, said support plates having a section thereof of a predetermined length removed between the entrance and exit ends of the conveyor so as to provide an opening, said parts carrier adapted to fit into said opening and support a plurality of said cylindrical parts, said parts carrier including a pair of laterally spaced support beams which longitudinally and horizontally align with said support plates when said parts carrier is positioned in said opening, a pair of cross bars interconnecting said support beams so as to provide a rigid container that can be selectively removed from said opening and replaced by an identical parts carrier, each of said support beams having the upper portion thereof formed with V-shaped notches which correspond in spacing and configuration with the V-shaped notches in said support plates, and cooperating pin and socket means formed with said parts carrier and said conveyor for assuring alignment of said support beams with said support plates when said parts carrier is placed in said opening so as to permit said positioning members to guide and control movement of the cylindrical parts on said support beams towards the exit end of the conveyor.

* * * * *